G. B. DE ARMENT.
HOOF SHEARS.
APPLICATION FILED MAR. 7, 1908.
908,969. Patented Jan. 5, 1909.
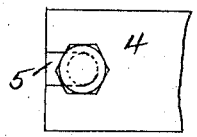
Fig. 1.
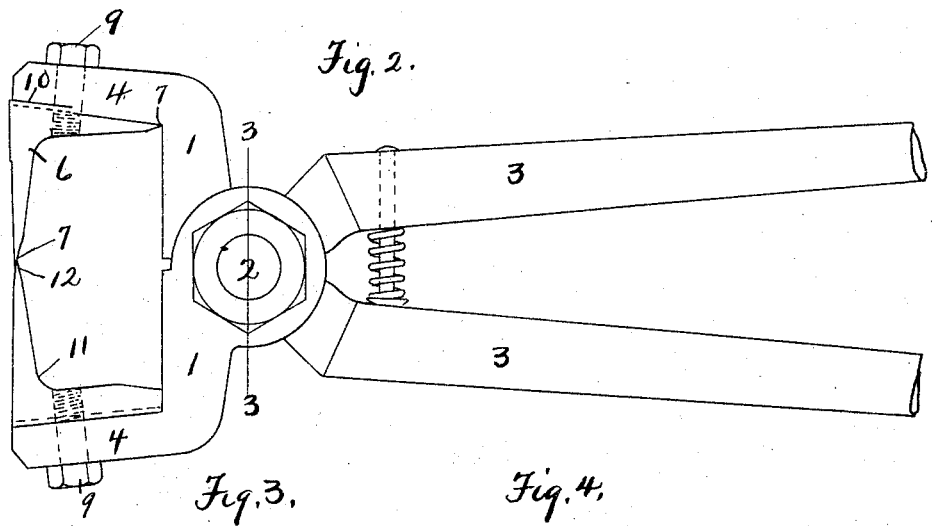
Fig. 2.
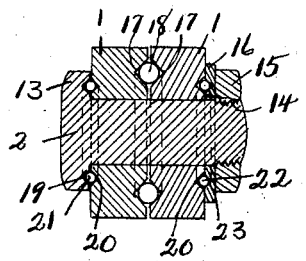
Fig. 3.
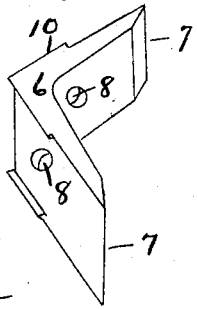
Fig. 4.
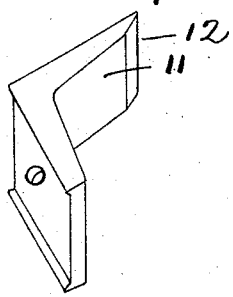
Fig. 5.
Fig. 6.
Witnesses
K. R. Kane
V. C. Hess
Inventor
George B. De Arment
by N. C. Lord
Attorney

UNITED STATES PATENT OFFICE.

GEORGE B. DE ARMENT, OF MEADVILLE, PENNSYLVANIA.

HOOF-SHEARS.

No. 908,969.   Specification of Letters Patent.   Patented Jan. 5, 1909.

Application filed March 7, 1908. Serial No. 419,630.

*To all whom it may concern:*

Be it known that I, GEORGE B. DE ARMENT, a citizen of the United States, residing at Meadville, in the county of Erie and State of Pennsylvania, have invented new and useful Improvements in Hoof-Shears, of which the following is a specification.

This invention relates to hoof shears and consists in certain improvements in the construction thereof as will be hereinafter fully described and pointed out in the claims.

One of the objects of the invention is to so reduce the friction and arrange for adjustments of the cutting edges that a single lever can be used. To this end a ball bearing is provided. This not only reduces the friction, but assures a proper relation between the cutting edges of the blades. The cutting blades are also made adjustable, so that a nice adjustment may be made of the cutting edges. In the preferred form the blades are angle shaped and reversible, so as to form two cutting edges.

The invention is illustrated in the accompanying drawings as follows:

Figure 1 shows a fragment of an end of the jaw. Fig. 2 a side elevation of the shears. Fig. 3 a section on the line 3—3 in Fig. 2. Fig. 4 a perspective view of a cutting blade having two cutting edges, the blade being reversible. Fig. 5 a perspective view of an alternative construction in which only one cutting edge is provided. Fig. 6 shows an end view of the jaw 4 and blade 6.

The jaws 1—1 are pivoted on the bolt 2, and each has the usual handle 3—3. The jaws have forward extensions 4. A slot 5 extends from the ends of these extensions inwardly. The cutting blades 6 are preferably angle shaped, and have the cutting edges 7—7. Each face of the blade forms a means for securing the blade to the projection or extension 4. In the preferred construction each side of the angle plate is provided with a screw threaded opening 8 which comes in register with the slot 5. The screw 9 extends through the slot and into this screw threaded hole, and the plate is thus secured, while the slot affords means for adjusting the cutting edge 7. I prefer to provide flanges 10 along the edges of the blade, so that when arranged in either position the ears extend along the sides of the extension 4, so as to maintain the blade in alinement and assist in securing it to the extension. The edges of the jaw are beveled as shown in Fig. 6 to assure a tight fit. In the construction shown I have shown a blade 12 on the lower jaw, this blade having but one cutting edge. It will of course be understood that both cutting blades can be of this form, or the preferred form 6.

The pivot bolt 2 has the head 13 at one end, and screw threads 14 on the opposite end on which is screwed the nut 15. A washer 16 locked against rotative movement is arranged between the nut 15 and jaw 1. The opposing faces of the jaws are provided with the annular grooves 17 in which are arranged the balls 18. These annular grooves are preferably far enough from the bolt to carry the balls out of contact with the bolt. The outer faces of the jaws have the annular grooves 20. The head of the bolt has an annular groove 19 opposite one of the annular grooves 20, and the balls 21 are arranged in this annular groove. The washer 16 has a similar annular groove 22 opposite the annular groove 20 in the companion jaw, and the balls 23 are arranged in these annular grooves forming a ball bearing. It will be readily observed that these ball bearings afford means for taking up the wear. They not only reduce the friction but permit of a nice adjustment of the edges 7 and 12, so that with this reduction in friction and adjustment of cutting edges hoofs may be readily cut.

What I claim as new is:

1. In a hoof shear, the combination of the jaws, one of which has a forward projection 4; an angle shaped cutter, one side of the angle forming a plate for attachment to the jaws, and the other side of the angle forming a cutting blade; and means for adjustably securing the blade to the jaw, comprising a slot in the jaw extending from the end of the jaw inwardly, and a screw extending through the slot into the side of the angle plate adjacent thereto.

2. In a hoof shear, the combination of the jaws, one of them having the forward projection; and an angle shaped cutter having cutting edges on each side of the angle, said sides being reversible, and each being adapted to be attached to the jaw.

3. In a hoof shear, the combination of the jaws, one of them having the forward projection; an angle shaped cutter having cutting edges on each side of the angle, said sides being reversible; and means for adjustably securing each side of the angle plate to the jaw.

4. In a hoof shear, the combination of the jaws one of which has the extension 4; and an angle shaped cutter, each side of the angle being provided with a cutting edge, and each adapted to be secured to the jaw to reverse the ends of the cutter and having the ears 10 on each angle in position to engage the sides of the extension with either edge of the blade in cutting position.

5. In a hoof shear, the combination of the jaws and cutting blades having cutting faces in planes parallel to the axis of the shear pivot; a pivot bolt for the jaws; and a ball bearing for the jaws arranged between the jaws and around the bolt.

6. In a hoof shear, the combination of the jaws and cutting blades having cutting faces in planes parallel to the axis of the shear pivot; a pivot bolt for the jaws; and a ball bearing for the jaws arranged between the jaws and around the bolt, the race ways being in the opposing faces of the jaws.

7. In a hoof shear, the combination of the jaws and cutting blades having cutting faces in planes parallel to the axis of the shear pivot; a pivot bolt for the jaws; and a ball bearing for the jaws arranged between the jaws and around the bolt, the race ways being in the opposing faces of the jaws, and arranged to carry the balls out of contact with the bolt.

8. In a hoof shear, the combination of the jaws and cutting blades having cutting faces in planes parallel to the axis of the shear pivot; a pivot bolt for the jaws; a ball bearing for the jaws arranged between the opposing faces of the jaws; and ball bearings between the outer faces of the jaws and the heads of the bolt.

9. In a hoof shear, the combination of the jaws and cutting blades having cutting faces in planes parallel to the axis of the shear pivot; a pivot bolt for the jaws; and ball bearings between the heads of the bolt and the outer faces of the jaws.

10. In a hoof shear, the combination of the jaws and cutting blades having cutting faces in planes parallel to the axis of the shear pivot arranged to overlap; a pivot bolt for said jaws; and a ball bearing arranged between the opposing faces of the jaws.

In testimony whereof I have hereunto set my hand in the presence of two subscribing witnesses

GEORGE B. DE ARMENT.

Witnesses
   H. C. LORD,
   J. R. CRAIG

It is hereby certified that the residence of the patentee in Letters Patent No. 908,969, granted January 5, 1909, upon the application of George B. De Arment, for an improvement in "Hoof-Shears," was erroneously printed "Meadville, in the county of Erie," whereas said residence should have been printed *Meadville, in the county of Crawford;* and that the proper corretions have been made in the files and records of the Patent Office, and are hereby made in said Letters Patent.

Signed and sealed this 6th day of April, A. D., 1909.

[SEAL.]                                       C. C. BILLINGS,

*Acting Commissioner of Patents.*